W. H. MILLER.
PROCESS OF MAKING COMPOSITE BIMETALLIC ARTICLES.
APPLICATION FILED JUNE 26, 1916.

1,250,612.   Patented Dec. 18, 1917.

Fig. 1.

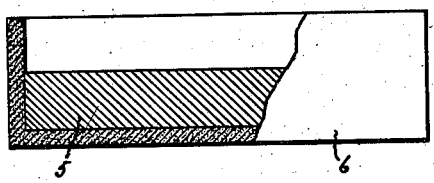

Fig. 5.

Bar of metal of low coefficient of expansion placed in mold and heated by oxy-acetylene flame to a bright red.

Fig. 2.

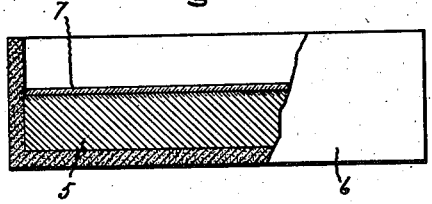

A fluxing agent sprinkled on surface of bar.

Bar brought to fusing temperature and a layer of a metal of high coefficient of expansion melted on its fluxed surface by oxy-acetylene flame.

Fig. 3.

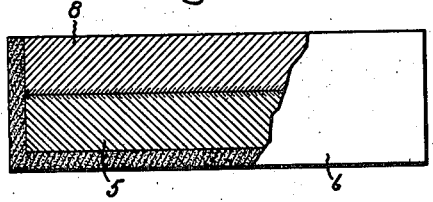

Surface of the layer of metal of high coefficient of expansion brought to molten state by oxy-acetylene flame and molten metal of the same composition poured on to the desired thickness.

Composition ingot shaped and cleaned.

Fig. 4.

Ingot rolled and annealed.

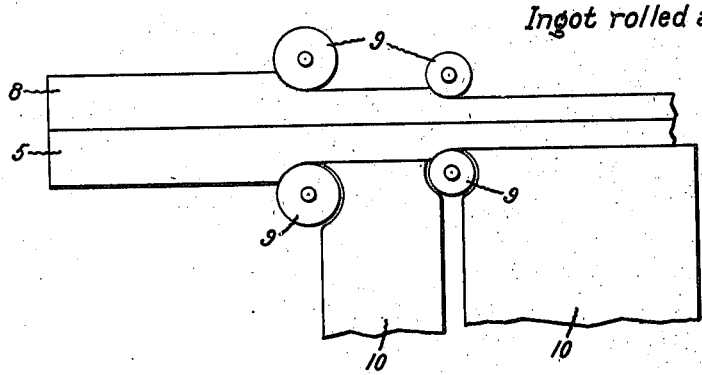

Inventor:
William H. Miller,
by *His Attorney.*

UNITED STATES PATENT OFFICE.

WILLIAM H. MILLER, OF FORT WAYNE, INDIANA, ASSIGNOR TO GENERAL ELECTRIC COMPANY, A CORPORATION OF NEW YORK.

PROCESS OF MAKING COMPOSITE BIMETALLIC ARTICLES.

1,250,612.  Specification of Letters Patent.  Patented Dec. 18, 1917.

Application filed June 26, 1916. Serial No. 105,847.

*To all whom it may concern:*

Be it known that I, WILLIAM H. MILLER, a citizen of the United States, residing at Fort Wayne, in the county of Allen, State of Indiana, have invented certain new and useful Improvements in Processes of Making Composite Bimetallic Articles, of which the following is a specification.

My invention relates to a process of making composite bi-metallic articles, and in particular to a process of uniting two dissimilar metal bodies having relatively different coefficients of expansion. Specifically, the invention relates to a process for the manufacture of thermostatic metal.

Thermostatic metal, as known in the art, is a composite bi-metallic article made up of two metals of relatively different coefficients of expansion. In its best known form thermostatic metal consists of strips or bars of two dissimilar metals having different coefficients of expansion securely united to form mechanically a single metallic strip or bar. The union of the two dissimilar metals must be very firm to withstand the strains occasioned by the bending or warping of the composite metal article when subjected to changes in temperature. As far as I am aware, it has heretofore been generally customary to unite the two dissimilar metals by soldering or brazing, and considerable difficulty has been experienced in uniting the two metals so that they would not separate or tear apart at their junction. The particular object of my present invention is to provide an improved process for the manufacture of thermostatic metal, and in general to provide an improved process for uniting two dissimilar metals, and in particular two dissimilar metals having different melting points and different coefficients of expansion.

In carrying out the invention, I unite the two dissimilar metals by an improved welding process which I preferably carry out with an oxy-acetylene flame or torch.

The novel features of the invention which I believe to be patentable are definitely indicated in the claims appended hereto. The invention itself will be best understood from the following description taken in conjunction with the accompanying drawing, in which:

Figures 1, 2, 3 and 4 diagrammatically represent the principal steps in my improved process of making composite bi-metallic articles; and Fig. 5 is a tabulated outline of the process.

The most sensitive thermostatic metal is obviously obtained by employing two dissimilar metals or alloys whose relative difference of coefficience of expansion is the greatest. Practically, the use of a special nickel-steel alloy having a relatively low coefficient of expansion and of a leaded brass having a relatively high coefficient of expansion has been found very satisfactory. Since it is difficult to roll a leaded brass, I have found it desirable to use a lead-free brass when the composite metal is to be subjected to a rolling operation, although the coefficient of expansion of a lead-free brass is relatively lower than that of a leaded brass. Thus, in carrying out my invention, I prefer to use the special nickel-steel alloy known as invar whose composition is substantially as follows:

Nickel_____ 35.5%
Carbon_____ .18%
Manganese_____ .42%
The remainder being pure iron.

Invar has an extremely low coefficient of expansion, and when a strip or sheet of this metal is united with a strip or sheet of brass the difference in the expansion and contraction of the invar and brass causes the composite metal strip or sheet to curl under temperature changes, thus providing a temperature responsive or thermostatic member. In order that constant and continuous performance may be obtained from this composite bi-metallic member, it is necessary that the two dissimilar metals of which it is composed be as perfectly united as is possible, and the particular aim of the present invention is to provide a process for uniting invar and brass to produce a satisfactory thermostatic metal.

In carrying out the invention, as digrammatically represented in Fig. 1, a bar of invar 5 of suitable dimensions is placed in a mold 6 made of refractory material held together by a suitable binder. The bar of invar is first uniformly heated to a bright red in the mold preferably by means of an oxy-acetylene flame. A suitable fluxing agent, such for example as powdered borax, is next sprinkled over the surface of the invar and allowed to fuse or melt. Starting at the upper end or end farthest away from the operator, the upper surface of the invar bar is then brought to a fusing temperature, and while in this state brass is melted on by means of the oxy-acetylene torch, and thus alloyed with the fused surface of the invar. This fusing and melting operation, or brassing as it is called in practice, is continued until the entire surface of the invar bar has received a uniform layer or coating of brass to a thickness of about ⅛ inch. This layer of brass is represented in Fig. 2 of the drawing by reference numeral 7.

A crucible of molten brass is prepared in the meantime. At the completion of the brassing of the invar, the oxy-acetylene flame is played over the brassed surface of the invar until the surface of the brass layer is in a molten condition. At this stage of the process sufficient molten brass from the crucible is poured into the mold and onto the brassed surface of the invar to produce the desired thickness of brass in the composition ingot. In Fig. 3 of the drawing, the brass is represented by reference numeral 8. The ingot 5—8 thus obtained is then allowed to remain in the mold until cool, when it may be removed and the process repeated for additional ingots. As previously stated, the brass used is preferably a lead-free brass, as the ingots are subsequently subjected to rolling operations, and since rolling leaded-brass in a factory presents some difficulties on account of cracking.

The composite ingot when removed from the mold is curved, and may be straightened on a face plate with a hammer until the invar is absolutely straight. The ingot is then placed in a suitable planer or shaper and cleaned up, care being taken to retain as much of the invar as possible. The brass is planed down to a thickness of about 20% greater than the thickness of the invar, and the sharp corners of the brass and invar are relieved or beveled to prevent excessive checking of the edge of the ingot in rolling. After shaping and cleaning, the composite ingot 5—8 is passed through suitable rolls 9 and reduced to the desired thickness, as diagrammatically represented in Fig. 4. In cold rolling it is necessary to anneal and clean the piece a number of times. The rolling operation is carried out with the brass up, as the invar has a tendency to curve away from the brass side after passing through the rolls and wraps itself around the roll. To prevent this, suitable landings or tables 10 are placed close to the rolls on which the end of the ingot can strike and slide as it emerges from the rolls, with the result that only the extreme end of the ingot is bent, while the remainder goes through the rolls straight. It is also best to always pass the ingot through the rolls in the same way, since it is thus much easier to keep the piece straight.

The annealing is carried out at a dull red heat, and it is only necessary to bring the metal to a uniform temperature, after which the piece may be taken from the furnace and allowed to cool in the air. It is very necessary to thoroughly clean the piece after annealing and before again rolling, as the slightest scale or foreign matter on the surface of the piece will roll out into large imperfections on the surface of the finished article. The cleaning is best accomplished by first pickling in hydrochloric acid until the scale on the invar has been loosened, then scratch brushing the brass side on a bristle wheel with pumice stone and the invar side on a brass wire wheel, and finally drying in hot saw-dust.

By the improved process of my present invention a relatively thin layer of brass is first welded to the invar bar. A perfectly welded union between the brass and invar is obtained by fusing at one time only a relatively small area of the fluxed surface of the invar. By means of the oxy-acetylene flame a small area of the fluxed surface of the invar is fused and a layer of brass melted thereon, whereby the whole of this small area under treatment can be easily heated to a uniform fused state, and a perfect weld obtained between the fused invar and the melted brass. This fusing and melting operation, or brassing, over small areas of the invar bar is progressively extended until the whole fluxed surface of the bar has been so treated, whereby the whole layer of brass is perfectly welded to the invar. I have found that the fused invar and melted brass alloy to a certain extent, which further insures a perfect union between the two dissimilar metals. It will be evident that the brass is actually welded to the invar without the use of a third metal, with the result, that if the brass is of suitable quality to roll properly it is impossible to separate the two metal strips, except by melting. Photomicrographs of the composite bi-metallic articles produced by the process of my invention show no definite line of demarcation between the invar and brass, indicating that the brass is alloyed with the surface of the invar, while in the case of every other thermostatic metal with which I am acquainted, photomicrographs show a very definite line of demarcation between the two dissimilar metals.

What I claim as new and desire to secure by Letters Patent of the United States, is:—

1. The process of making a bi-metallic article which comprises the consecutive steps of heating a body of metal contained in a mold, applying a fluxing agent to a surface of the heated metal, fusing a small area of the fluxed surface of said body of metal and melting onto the fused area a relatively thin layer of a second metal and progressively extending this fusing and melting operation over the whole fluxed surface of said body of metal, and pouring molten metal of the same composition as said second metal upon said layer of the second metal.

2. The process of making a bi-metallic article which comprises the consecutive steps of fusing a small area of a surface of a body of metal and melting onto the fused area a relatively thin layer of a second metal and progressively extending this fusing and melting operation over the whole of this surface of said body of metal, and pouring molten metal of the same composition as said second metal upon said layer of the second metal.

3. The process of making a bi-metallic article which comprises the consecutive steps of heating to a bright red a body of metal contained in a mold, applying a fluxing agent to a surface of the heated metal, fusing a small area of the fluxed surface of said body of metal and melting onto the fused area a relatively thin layer of a second metal and progressively extending this fusing and melting operation over the whole fluxed surface of said body of metal, heating the resulting layer of said second metal until its whole surface is in a molten condition, and pouring molten metal of the same composition as said second metal upon said layer of the second metal.

4. The process of making a bi-metallic article which comprises the consecutive steps of heating a body of metal, applying a fluxing agent to a surface of the heated metal, fusing the fluxed surface of the metal and melting onto the fused surface a relatively thin layer of a second metal, and pouring molten metal of the same composition as said second metal upon said layer of the second metal.

5. The process of making a bi-metallic article which consists in heating a body of one of the metals of such article, fusing a surface of the heated metal and melting onto the fused surface a relatively thin layer of the second metal of said article, and pouring molten metal of the same composition as said second metal upon said layer of the second metal.

6. The process of making thermostatic metal which comprises the consecutive steps of heating a body of metal of low coefficient of expansion contained in a mold, applying a fluxing agent to a surface of the heated metal, fusing a small area of the fluxed surface of said body of metal and melting onto the fused area a relatively thin layer of a second metal of relatively high coefficient of expansion and progressively extending this fusing and melting operation over the whole fluxed surface of said body of metal, and pouring molten metal of the same composition as said second metal upon said layer of the second metal.

7. The process of making thermostatic metal comprising fusing a small area of a surface of a body of metal of low coefficient of expansion at one end thereof and melting onto the fused area a relatively thin layer of a second metal of relatively high coefficient of expansion and progressively extending this fusing and melting operation over the whole of this surface of said body of metal, and pouring molten metal of the same composition as said second metal upon said layer of the second metal.

8. The process of making thermostatic metal which comprises the consecutive steps of heating a bar of nickel-steel alloy contained in a mold, applying a fluxing agent to a surface of the heated alloy, fusing a small area of the fluxed surface of said alloy and melting onto the fused area a relatively thin layer of brass and progressively extending this fusing and melting operation over the whole fluxed area of said alloy, and pouring molten brass upon said layer of brass.

9. The process of making thermostatic metal comprising fusing a small area of a surface of a bar of nickel-steel alloy and melting onto the fused area a relatively thin layer of brass and progressively extending this fusing and melting operation over the whole of this surface of said alloy, and pouring molten brass upon said layer of brass.

10. The process of making thermostatic metal which comprises the consecutive steps of heating to a bright red a bar of nickel-steel alloy contained in a mold, applying a fluxing agent to a surface of the heated alloy, fusing a small area of the fluxed surface of said alloy and melting onto the fused area a relatively thin layer of brass and progressively extending this fusing and melting operation over the whole fluxed surface of said alloy, heating the resulting layer of brass until its whole surface is in a molten condition, and pouring molten brass upon said layer of brass.

In witness whereof, I have hereunto set my hand this 19 day of June 1916.

WILLIAM H. MILLER.